(12) United States Patent
Shimizu et al.

(10) Patent No.: US 6,693,269 B2
(45) Date of Patent: Feb. 17, 2004

(54) IMAGE READER WITH DC-COUPLED INTEGRATION CIRCUIT

(75) Inventors: Hitoshi Shimizu, Kaisei-machi (JP); Shu Sato, Kaisei-machi (JP); Taizo Akimoto, deceased, late of Kaisei-machi (JP); Yaeko Akimoto, legal representative, Minamiashigara (JP); Taisuke Akimoto, legal representative, Minamiashigara (JP); Kousuke Akimoto, legal representative, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 65 days.

(21) Appl. No.: 09/922,929

(22) Filed: Aug. 7, 2001

(65) Prior Publication Data

US 2002/0043625 A1 Apr. 18, 2002

(30) Foreign Application Priority Data

Aug. 7, 2000 (JP) .......................................... 2000-238257

(51) Int. Cl.$^7$ ............................ H01L 27/00; G01N 23/04
(52) U.S. Cl. ................................ 250/208.1; 250/214 L; 250/586; 356/417
(58) Field of Search ........................ 250/208.1, 214 A, 250/214 L, 458.1, 461.1, 586, 207, 214 VT; 327/307; 356/317, 318, 417

(56) References Cited

U.S. PATENT DOCUMENTS

| | | | | |
|---|---|---|---|---|
| 4,369,367 A | * | 1/1983 | Horikawa | .................... 250/856 |
| 4,505,583 A | * | 3/1985 | Konomi | ........................ 356/73 |
| 4,865,967 A | | 9/1989 | Shiraishi et al. | ................ 435/6 |
| 4,889,990 A | | 12/1989 | Hosoi et al. | .............. 250/327.2 |
| 5,130,529 A | * | 7/1992 | Muro | ...................... 250/214 L |
| 5,149,972 A | * | 9/1992 | Fay et al. | ................. 350/461.1 |
| 5,260,190 A | | 11/1993 | Shiraishi et al. | ................ 435/6 |
| 5,270,162 A | | 12/1993 | Shiraishi et al. | ................ 435/6 |
| 5,672,881 A | * | 9/1997 | Striepeke et al. | ......... 250/461.2 |
| 5,705,821 A | * | 1/1998 | Barton et al. | ............. 250/458.1 |
| 5,900,640 A | | 5/1999 | Ogura | ......................... 250/583 |
| 6,025,589 A | * | 2/2000 | Aswell et al. | ............... 250/226 |

FOREIGN PATENT DOCUMENTS

| | | | | |
|---|---|---|---|---|
| JP | 59-15843 | 1/1984 | ........... | G01N/23/20 |
| JP | 61-93538 | 5/1986 | ............ | H01J/37/20 |
| JP | 64-60782 | 3/1989 | ........... | F04B/39/00 |
| JP | 64-60784 | 3/1989 | ........... | F04B/39/00 |
| JP | 4-3952 | 1/1992 | ........... | H01L/21/66 |
| JP | 10-3134 | 1/1998 | ........... | G03B/42/02 |

OTHER PUBLICATIONS

Malmstadt et al., Electronics and Instrumentation for Scientists. Menlo Park, CA: Benjamin/Cummings Publishing Company, Inc., 1981, p. 173.*

* cited by examiner

Primary Examiner—Stephone B. Allen
(74) Attorney, Agent, or Firm—Sughrue Mion, PLLC

(57) ABSTRACT

A photomultiplier which detects feeble light emitted by the irradiation of excitation light on an image carrier carrying an image related to a living organism has an integration circuit is DC-coupled with a photomultiplier to convert a current signal output from the photomultiplier, to a voltage signal. The voltage signal converted by the integration circuit is logarithmically compressed with a logarithmic conversion circuit. An offset compensation circuit is provided for reducing an offset voltage that could occur because of charge injection in the integral action of the integration circuit.

19 Claims, 13 Drawing Sheets

F I G. 2
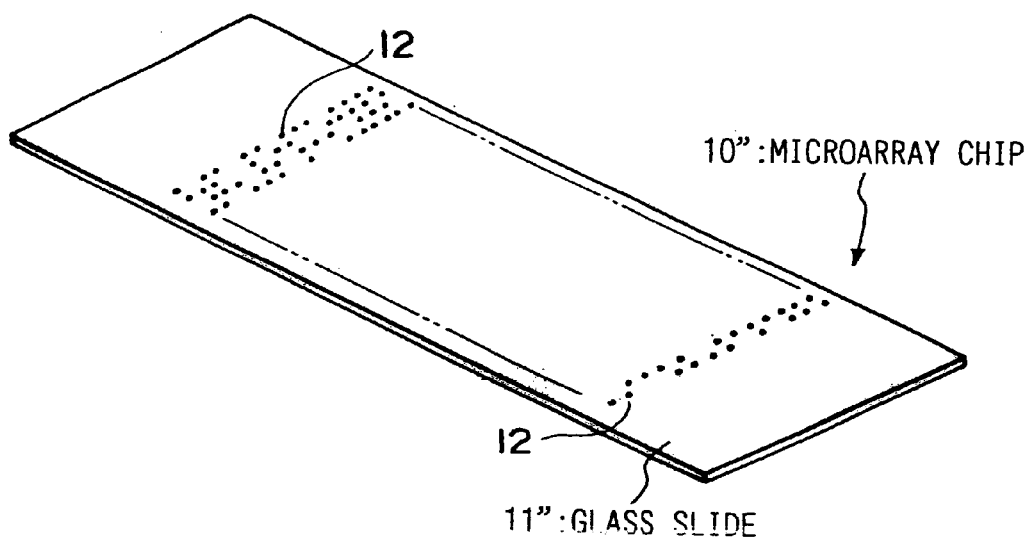

OPERATING-MODE SETTING CIRCUIT

INTEGRAL-TIMING SETTING CIRCUIT

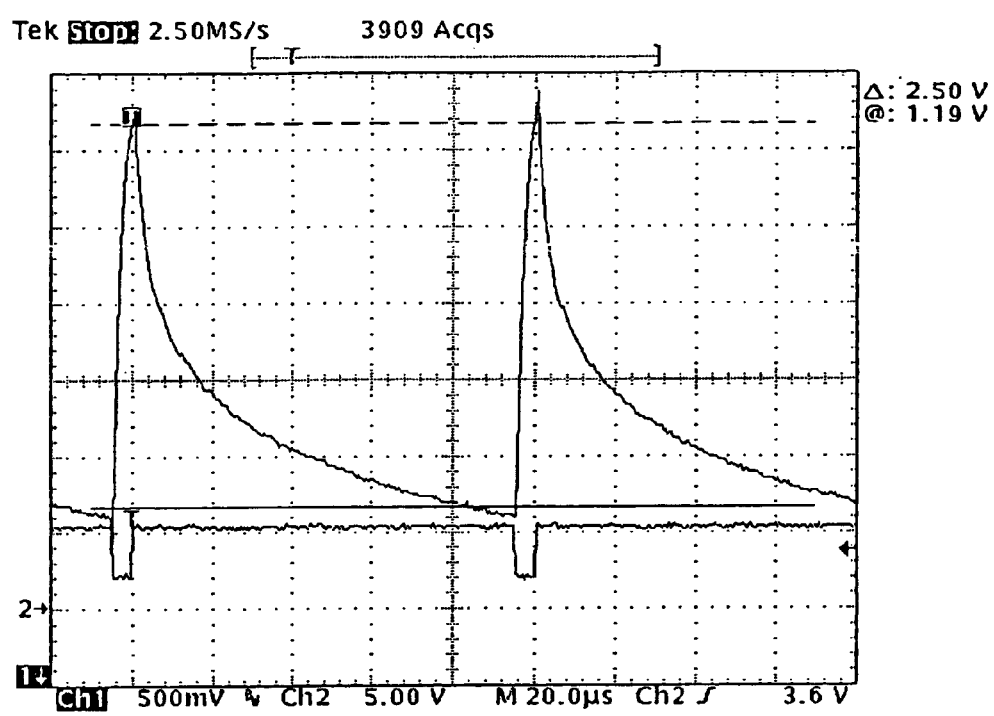
F I G .10

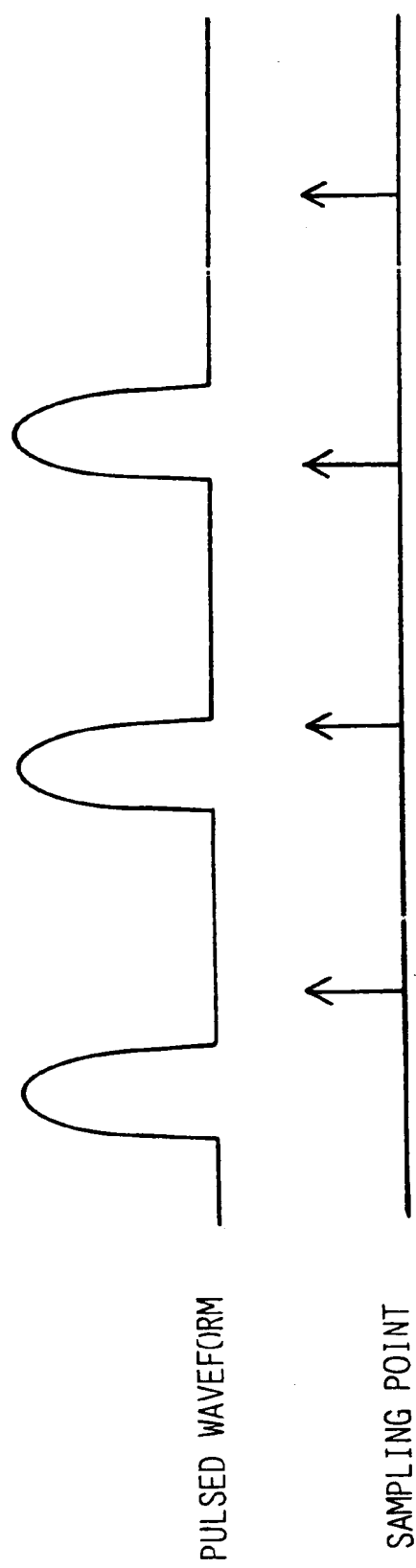

IMAGE READER WITH DC-COUPLED INTEGRATION CIRCUIT

BACKGROUND OF THE INVENTION

1. Field of the Invention

The present invention relates generally to an image reader, and more particularly to an image reader that is usable in an autoradiographic system employing an X-ray film or storable phosphor sheet, a detection system using an electron microscope, a radiation diffraction image detection system, and a fluorescence detection system, the image reader being equipped with photoelectric conversion means having a photoelectron multiplication function, a current-voltage conversion circuit, and a logarithmic conversion circuit.

2. Description of the Related Art

In autoradiography, a radioactive labeling substance is injected into a living organism, and the living organism or part of the tissue of the living organism is sampled. This sample is stacked on a photosensitive material such as an X-ray film for a fixed time and is exposed to light. Based on the exposed part of the photosensitive material, the positional information on the radioactive labeling substance in the sample is obtained.

This autoradiography has been widely utilized in the following manner. For example, a radioactive labeling substance is injected into a medium which contains an organism-oriented high molecular substance such as the tissue of a living organism, protein, a nucleic acid, etc. The high molecular substance with the radioactive labeling substance, the derivative, or the decomposed substance, is separated on a gel support body by a separation operation such as gel electrophoresis. The gel support body is stacked on a radiation film such as a high-sensitivity X-ray film for a fixed time and is exposed to light. Based on the positional information on the radiation labeling substance obtained from the exposed part of the radiation film, the separation and identification of the high molecular substance, or the molecular weight measurement and characteristic evaluation of the high molecular substance, is performed. This autoradiography has also been utilized effectively in determining the base (nucleotide) sequence of a nucleic acid such as deoxyribonucleic acid (DNA).

In addition, as shown in Japanese Patent Publication Nos. 1(1989)-60784, 1(1989)-60782, and 4(1992)-3952 and Japanese Unexamined Patent Publication No. 10(1998)-3134, autoradiography employing a storable phosphor sheet instead of a conventional radiation film has also been put to practical use. The storable phosphor sheet is used as a photosensitive material for obtaining the positional information on a radioactive labeling substance. The storable phosphor sheet has a stimulatable phosphor layer, which contains a stimulatable phosphor. The stimulatable phosphor absorbs and stores energy of radiation when irradiated with the radiation, and emits photostimulated luminescent light, having a quantity of light corresponding to the quantity of the stored radiation energy, when excited with an electromagnetic wave such as visible light, infrared light, etc.

In autoradiography employing the storable phosphor sheet, a sample containing a radioactive labeling substance is stacked on the storable phosphor sheet for a fixed time, and the storable phosphor sheet absorbs at least part of radiation energy emitted from the radioactive labeling substance. Then, the radiation energy is emitted as photostimulated luminescent light from the storable phosphor sheet by scanning the storable phosphor sheet with an electromagnetic wave such as laser light, etc. The emitted, photostimulated luminescent light is photoelectrically detected, and the positional information on the radioactive labeling substance in the sample is obtained.

Japanese Unexamined Patent Publication Nos. 59(1984)-15843, 61(1986)-51738, and 61(1986)-93538, for example, disclose a detection system, which uses an electron microscope, for irradiating electron beams to a living organism and detecting the image of the living organism, and a radiation diffraction image detection system for irradiating radiation to a sample, detecting a radiation diffraction image, and making a structural analysis of the sample. As shown in these publications, a stimulatable phosphor is employed as a material for detecting electron beams or radiation. The stimulatable phosphor has the property of absorbing and storing the energy of electron beams or radiation when irradiated with the electron beams or radiation and also emitting photostimulated luminescent light having a quantity of light corresponding to the quantity of the stored electron-beam or radiation energy when excited with an electromagnetic wave in a specific wavelength region. Electron beams are irradiated to a metal or non-metal sample, and the diffraction image or transmitted image of the sample is detected. Based on the detected image, an element analysis, a composition analysis of the sample, a structural analysis of the sample, etc., are made.

There is also a fluorescence detection system using a fluorescent dye (labeling substance) instead of the radioactive labeling substance used in the autoradiographic system. This detection system can make an evaluation of a gene sequence and a gene expression level, an evaluation of the excretion, absorption, metabolism path, and state of an injected substance in a laboratory mouse, a separation and identification of protein, a measurement of a molecular weight, and an evaluation of characteristics, by reading a fluorescence image. For example, after a fluorescent dye is added into a solution containing a plurality of DNA fragments that are electrophoresed, the DNA fragments are electrophoresed on a gel support body. Alternatively, a plurality of DNA fragments are electrophoresed on a gel support body containing a fluorescent dye. Or, after a plurality of DNA fragments are electrophoresed on a gel support body, the gel support body is immersed into a solution containing a fluorescent dye. Next, after the thus-electrophoresed DNA fragments have been labeled, the fluorescent dye is excited with excitation light and fluorescent light is emitted. The emitted fluorescent light is detected, and an image is generated to detect DNA distribution on the gel support body. Alternatively, after a plurality of DNA fragments are electrophoresed on a gel support body, they are denatured. Next, at least some of the denatured DNA fragments are transferred onto a transfer support body such as nitrocellulose by Southern blotting, and target DNA and complementary DNA (or RNA) are labeled with a fluorescent dye to prepare a DNA or RNA probe. The DNA or RNA probe and the denatured DNA fragments are hybridized so that only the DNA or RNA probe and cDNA fragments are selectively labeled. The fluorescent light, emitted by exciting the fluorescent dye with excitation light, is detected to generate an image. A distribution of target DNAs on the transfer support body can also be detected. Furthermore, a cDNA probe, complementary to DNA containing a target gene labeled with a labeling substance, is prepared and hybridized with DNA on the transfer support body. After it is bound with the labeled cDNA, enzyme is brought into contacted with a fluorescent substrate. The fluorescent substrate is turned into a fluorescent substance which emits fluorescent light. The fluorescent light, emitted by exciting the generated fluorescent substance with excitation light, is detected and an image is generated. With this image, a distribution of target DNAs on the transfer support body can also be detected. These fluorescence detection systems have the advantage that they can easily detect a gene sequence, etc., without using a radioactive substance.

As described in the "gene expression analysis employing a microarray chip (Experimental Medical Series, Vol. 17, Jan. 1999, pp. 61 to 65)" and "gene medical science (Vol. 4, No. 1, 2000 (Medical Do))," attention has recently been paid to application of the aforementioned fluorescence detection system to the gene expression analysis technique employing a test piece such as a microarray chip, a macroarray chip, a DNA chip, etc.

The gene expression analysis technique employs a test piece, in which a wide variety of known different biomolecules (such as cDNA, oligo-DNA, other DNAs, PNA, EST, etc.) having already been translated are disposed and spotted in matrix form as probes (detecting substances) on the surface of a substrate, such as a membrane filter, a glass substrate, a glass slide substrate, a silicon substrate, etc., at predetermined intervals of a few hundreds $\mu$m or less (e.g., 20 to 200 $\mu$m) by a spotter, etc. The test piece is called a microarray chip, a macroarray chip, a DNA chip, etc., depending on the substrate type, the substrate size, the number of spots, the spot size, the probe type, the target type, etc.

On the other hand, biomolecules such as cDNA, genomic DNA, RNA (messenger RNA, etc.), dNTP, PNA, etc., are labeled with a radioactive isotope or fluorescent dye and prepared as targets that are detected.

When an analysis is made by the aforementioned gene express analysis technique, DNA (an example of an organism-oriented substance) taken out from the cell of a healthy person (target A) labeled with a fluorescent dye a, and DNA taken out from a target B with a genetic disease labeled with a fluorescent dye b, are dropped on a microarray chip with a pipette so that each DNA is hybridized with cDNA on the microarray chip. Then, each cDNA on the microarray chip is scanned with excitation light that separately excites the fluorescent dyes a and b, and fluorescent light is photoelectrically detected for each cDNA. From the results of detection corresponding to the positions on the microarray chip from which fluorescent light was emitted, it is decided which of the cDNAs has been hybridized with each DNA. Finally, DNAs expressed or lost due to the genetic disease are specified by comparing the cDNAs hybridized between the two targets A and B.

The autoradiographic system employing an X-ray film or storable phosphor sheet, the detection system using an electro microscope, the radiation diffraction image detection system, and the fluorescence detection system (hereinafter referred to as various detection systems) are, incidentally, equipped with an image reader. In the image reader, an image carrier, which carries a fluorescent image or radiation image related to a living organism, such as a storable phosphor sheet, a gel support body, or a transfer support body carrying an image, is scanned with excitation light. Fluorescent light or photostimulated luminescent light, emitted from the image carrier, is detected photoelectrically by photoelectric conversion means, and an image is generated.

The photoelectric conversion means, for photoelectrically detecting fluorescent light or photostimulated luminescent light, employs an avalanche photodiode (APD), a photomultiplier, etc., which have a photoelectron multiplication function, because the fluorescent light or photostimulated luminescent light is feeble light whose intensity (light quantity) is not so strong.

In the current-voltage conversion circuit for converting the electrical signal, output from the photoelectric conversion means, to a voltage signal (hereinafter also referred to as I-V conversion), it is common practice from the point of view of simplicity of construction and cost to perform a detection by DC coupling, employing resistance.

It is also standard practice, in consideration of enlargement of a dynamic range and a manner of being visually observed when a result of detection is imaged, to logarithmically compress an I/V-converted voltage signal with a logarithmic conversion circuit.

The size of a pixel that is read is required to be about 200 $\mu$m or less, and in connection with the reading speed, the sampling frequency $f_S$ employed in converting the logarithmically-compressed analog voltage signal to a digital voltage signal (hereinafter also referred to as A/D conversion) is of an intermediate speed of about 10 to 1000 KHz.

That is, each detection circuit in the aforementioned various detection systems is constructed so that it performs I/V conversion employing resistance, logarithmic conversion, and intermediate-speed sampling.

On the other hand, presently there is a strong demand for information of higher resolution. The intensity (light quantity) of fluorescent light or photostimulated luminescent light that is incident on the aforementioned photoelectric conversion means has been increasingly reduced. In other words, a region that is detected has been shifted to a high-sensitivity side.

However, when feeble light is irradiated, for example, to a photomultiplier, photons incident on the photoelectric surface of the photomultiplier become sparse with respect to time. For this reason, a current which is observed when electrons generated by the photons are multiplied and reach the collector becomes pulsed. A voltage signal which is obtained by performing I/V conversion on the current output from the photomultiplier, using a conversion resistance of about 1000 k$\Omega$, also becomes pulsed.

Even when light is feeble, stable direct-current (DC) output is obtained in a region where the light intensity is great to some degree. However, output pulses that are approximately even in height are continuously connected, as the light intensity becomes smaller. That is, the DC output fluctuates. If the light intensity becomes even smaller, output pulses that are approximately even in height will be dispersed, and the frequency of pulses will change, depending on light intensity. As a result, a single pulse region is obtained. That is, if the light intensity becomes smaller, the DC output will go to a state close to photon counting.

In this case, if a voltage signal is obtained by a conventional I/V conversion circuit employing resistance and is converted to a digital signal, a non-signal portion in a pulsed signal not synchronized with a sampling clock signal will sometimes be sampled during A/D conversion, as shown in FIG. 13. As a result, there are voltage signals that are not sampled. That is, voltage signals are sampled in a manner having considerably great level variations, and the S/N ratio of an image signal is degraded.

To avoid this, there is a method of providing a filter before A/D conversion. However, if a logarithmically compressed signal is passed through the filter and converted to a digital signal, the transient response characteristic (nonlinear response characteristic) portion in the logarithmic conversion circuit will be sampled and therefore the signal will vary widely and signal linearity will be lost. In addition, it will become difficult to discriminate background noise from signals. As a result, a very coarse image is obtained and there arises a problem that quantification will become difficult.

Furthermore, if an analog filter is provided at the input side in order to avoid repeated noise, which corresponds to a relatively intermediate speed sampling frequency $f_S$ of about 10 to 1000 KHz, during A/D conversion, ripple or tailing will occur when a pulsed signal is input to the A/D converter circuit and will have adverse effects on an image. Practically, there are also circumstances where A/D conversion must be performed without antialiasing.

SUMMARY OF THE INVENTION

The present invention has been made in view of the circumstances mentioned above. Accordingly, it is an object of the present invention to provide an image reader that can be used in the aforementioned various detection systems. Another object of the invention is to provide an image reader which is capable of generating a satisfactory image by obtaining a suitable image signal even in the case of detecting light that is more feeble than conventional light. Still another object of the invention is to provide an image reader in which quantification is easy even in the case of detecting light that is more feeble than conventional light.

To achieve the objects mentioned above, there is provided an image reader comprising:

excitation light irradiation means for irradiating excitation light to an image carrier carrying a fluorescent image or radiation image related to a living organism;

photoelectric conversion means, which has a photon multiplication function, for photoelectrically detecting feeble light emitted by irradiation of the excitation light, and outputting a current signal which has a magnitude corresponding to the light quantity of the feeble light;

a current-voltage conversion circuit for converting the current signal to a voltage signal; and a logarithmic conversion circuit for logarithmically converting the voltage signal converted by the current-voltage conversion circuit;

wherein an integration circuit, DC-coupled with the photoelectric conversion means, is employed as the current-voltage conversion circuit.

The expression "image carrier carrying a fluorescent image or radiation image related to a living organism" refers to an image carrier carrying a fluorescent image or radiation image related to a living organism, such as a storable phosphor sheet, a gel support body, or a transfer support body carrying an image which is read in the autoradiographic system employing an X-ray film or storable phosphor sheet, the detection system using an electron microscope, the radiation diffraction image detection system, or the fluorescence detection system.

More specifically, in the case of the autoradiographic system employing a storable phosphor sheet, the image carrier refers to a storable phosphor sheet obtained in the following manner. That is, a radioactive labeling substance is injected into a medium that contains an organism-oriented high molecular substance such as the tissue of a living organism, protein, a nucleic acid, etc. The high molecular substance with the radioactive labeling substance is stacked on a storable phosphor sheet for a fixed time and is exposed to light. The storable phosphor sheet carries an image represented by the radioactive labeling substance. Also, in the case of the fluorescence detection system using a fluorescent dye as a labeling substance, the image carrier refers to a gel support body, a microarray chip, a macroarray chip, or a DNA chip, subjected to a hybridization process, which carries an image represented by a fluorescent dye.

In the case of a system for detecting fluorescence (self-fluorescence) emitted from a living organism or a dye contained in the tissue piece, the living organism or tissue piece itself may be used as the image carrier.

In the image reader of the present invention, it is desirable that an analog-digital conversion circuit be provided after the logarithmic conversion circuit. The analog-digital conversion circuit is used for performing analog-digital conversion on the logarithmically converted voltage signal at a sampling frequency of between 10 KHz and 1 MHz.

In the image reader of the present invention, it is desirable that the current-voltage conversion circuit be constructed so that it can stop integral action of the integration circuit.

It is desirable that the integration circuit of the image reader of the present invention have a differential amplifier, an integration capacitor connected between one input terminal and an output terminal of the differential amplifier, and a reset field-effect transistor, connected in parallel with the integration capacitor, for resetting the integration capacitor.

The integration circuit in this form is grouped into two types of construction: a mirror integration construction in which an integration capacitor is connected between an inverting input terminal and an output terminal of a differential amplifier; and a boot strap integration construction in which an integration capacitor is connected between a non-inverting input terminal and an output terminal of a differential amplifier. In the present invention, the mirror integration construction is preferable to the boot strap integration construction, because an offset compensation circuit described later becomes structurally simpler.

The expression "between one input terminal and an output terminal of the differential amplifier" varies depending on the integration circuit construction. For instance, in the case of mirror integration construction, it refers to "between an inverting input terminal and an output terminal." In the case of boot strap integration construction, it refers to "between a non-inverting input terminal and an output terminal." Note that the integration capacitor may be connected directly to the output terminal of the differential amplifier, or it may be connected to the output terminal through resistance.

In the case where the integration circuit in this form is used, noise that occurs during setting or resetting of the integration circuit causes charge injection, which results in offset voltage (DC component) that is output from the integration circuit. This offset voltage is the direct cause of a variation in the output voltage of the integration circuit, because it can vary according to the capacitance of an integration capacitor or capacitance of a reset field-effect transistor (device variations).

Therefore, the image reader of the present invention further comprises an offset compensation circuit which has a compensation field-effect transistor. The compensation field-effect transistor has a drain terminal and a source terminal, connected between the other input terminal of the differential amplifier and a reference potential, and also has a gate terminal to which control voltage is input for adjusting a capacitance variation in the integration capacitor and/or a capacitance variation in the reset field-effect transistor.

In this case, it is preferable that a compensation capacitor having the same capacitance as the capacitance of the integration capacitor be connected in parallel with the compensation field-effect transistor.

The expression "a drain terminal and a source terminal, connected between the other input terminal of the differential amplifier and a reference potential" means that one of the drain and source terminals is connected to the aforementioned other input terminal, while the other of the drain and source terminals is connected to the reference potential.

The expression "between the other input terminal of the differential amplifier and a reference potential" varies in integration circuit construction. For example, in the case of mirror integration construction, it refers to "between a non-inverting input terminal and a ground potential (reference potential)." In the case of boot strap integration construction, it refers to "between an inverting input terminal and an operating-point setting potential (reference potential)."

In the integration circuit of the image reader of the present invention, it is preferable that the reset field-effect transistor and the compensation filed-effect transistor have small input capacitance and feedback capacitance. For instance, they may be junction field-effect transistors.

The image reader of the present invention may further comprise means for cooling the photoelectric conversion means. It is preferable that the cooling means be constructed, for example, of a Peltier element.

The application of the aforementioned offset compensation circuit is not limited to an image reader which is used in an autoradiographic system employing an X-ray film or storable phosphor sheet, a detection system using an electron microscope, a radiation diffraction image detection system, and a fluorescence detection system. The offset compensation circuit is also applicable to a voltage-signal acquisition circuit, which comprises: (1) an integration circuit having a differential amplifier, an integration capacitor connected between one input terminal and an output terminal of the differential amplifier, and a reset field-effect transistor, connected in parallel with the integration capacitor, for resetting the integration capacitor; and (2) a logarithmic conversion circuit for logarithmically converting a voltage signal output from the integration circuit. As with the aforementioned case, it is preferable that the reset field-effect transistor and the compensation filed-effect transistor employ junction field-effect transistors.

According to the image reader of the present invention, an integration circuit, DC-coupled with photoelectric conversion means, is employed as a current-voltage conversion circuit that is provided before a logarithmic conversion circuit. Therefore, even in the case of detecting such extremely feeble light that a single pulse signal is input as a current signal, pulse signals are integrated and converted to a voltage signal. As a result, an image signal which is more suitable than a conventional one can be obtained.

That is, there is no need to input a pulse waveform, as it is, to an A/D conversion circuit or logarithmic conversion circuit. Therefore, even if an input current signal is a current signal in the form of a pulse, a non-signal portion in the pulse waveform not synchronized with a sampling clock signal can be prevented from being sampled, except when the pulse current signal coincides with reset timing. As a result, the S/N ratio of an image can be enhanced compared with the prior art.

Since the integration circuit is provided before the logarithmic conversion circuit, the transient response characteristic portion of the logarithmic conversion circuit can be prevented from being sampled. As a result, there is no problem of signal linearity being lost or quantification becoming difficult.

The image reader of the present invention employs the integration circuit, which has a differential amplifier, an integration capacitor connected between one input terminal and an output terminal of the differential amplifier, and a reset field-effect transistor, connected in parallel with the integration capacitor, for resetting the integration capacitor. Particularly, if the integration circuit has a mirror integration construction in which an integration capacitor is connected between the inverting input terminal and an output terminal of a differential amplifier, an integration circuit with a relatively intermediate response speed corresponding to a sampling frequency of 10 KHz to 1 MHz for A/D conversion can be made structurally simple.

In the case of employing the aforementioned integration circuit, there is provided an offset compensation circuit having a compensation field-effect transistor. The compensation field-effect transistor has a drain terminal and a source terminal, connected between the other input terminal of the differential amplifier and a reference potential, and also has a gate terminal to which a control voltage is input for adjusting a capacitance variation in the integration capacitor and/or a capacitance variation in the reset field-effect transistor. As a result, the offset voltage that may occur because of charge injection during integral action can be reduced.

BRIEF DESCRIPTION OF THE DRAWINGS

The present invention will be described in further detail with reference to the accompanying drawings wherein:

FIG. 2 is a perspective view showing a microarray chip, obtained after a hybridization process, which is read by the image reader shown in FIG. 1;

FIG. 10 is a voltage waveform diagram obtained by a direct current input to the integration circuit;

FIG. 13 is a diagram used for explaining conventional problems.

DESCRIPTION OF THE PREFERRED EMBODIMENTS

Figure 1:
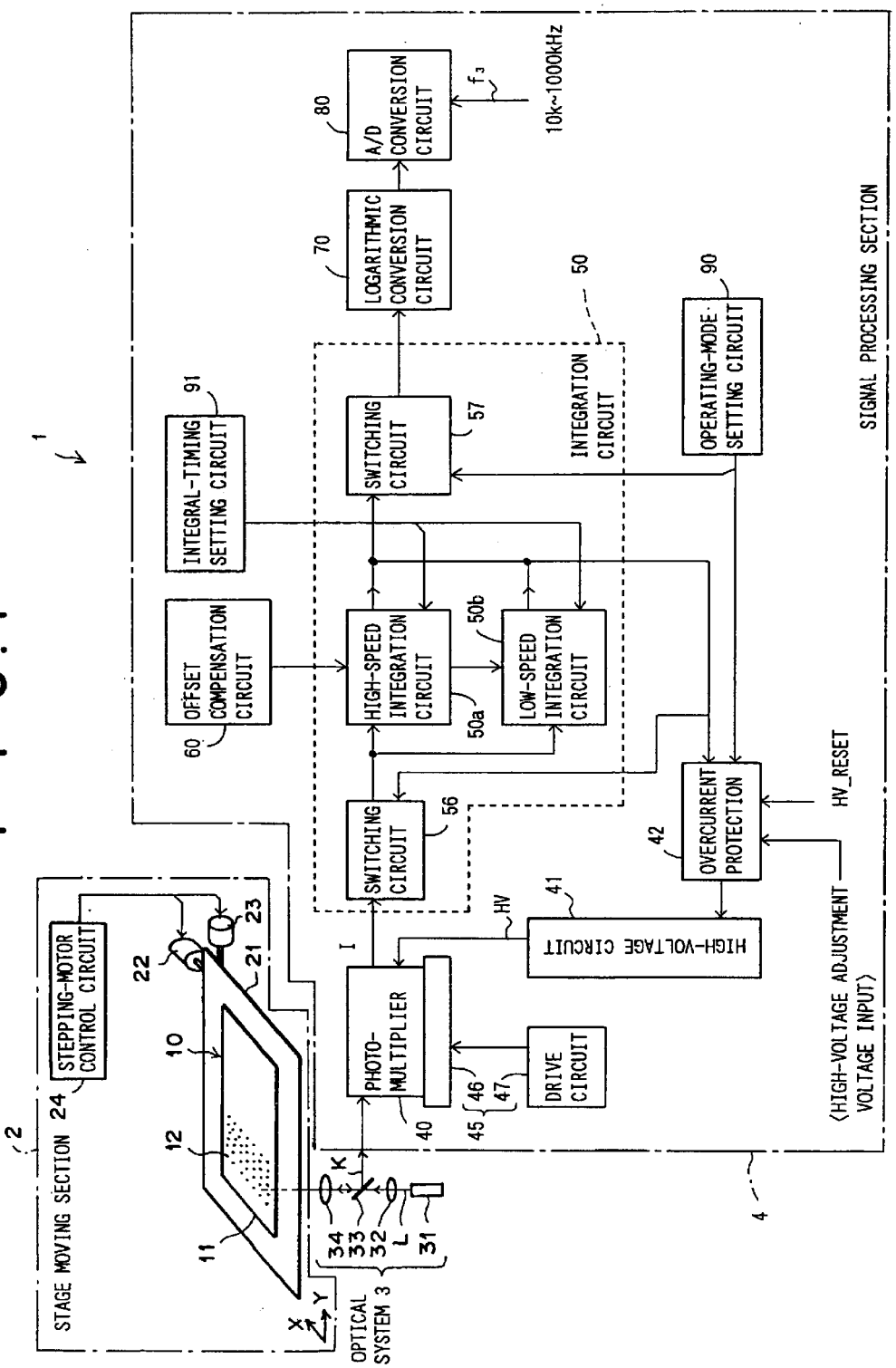
FIG. 1 is a schematic diagram showing an image reader for a microarray chip, constructed according to an embodiment of the present invention.

Referring now in greater detail to the drawings and initially to FIG. 1, there is shown a preferred embodiment of an image reader 1 in accordance with the present invention. A microarray chip 10 after a hybridization process is shown in FIG. 2 and is read by the image reader 1. A microarray chip 10" before the hybridization process is shown in FIG. 3.

Figure 3:
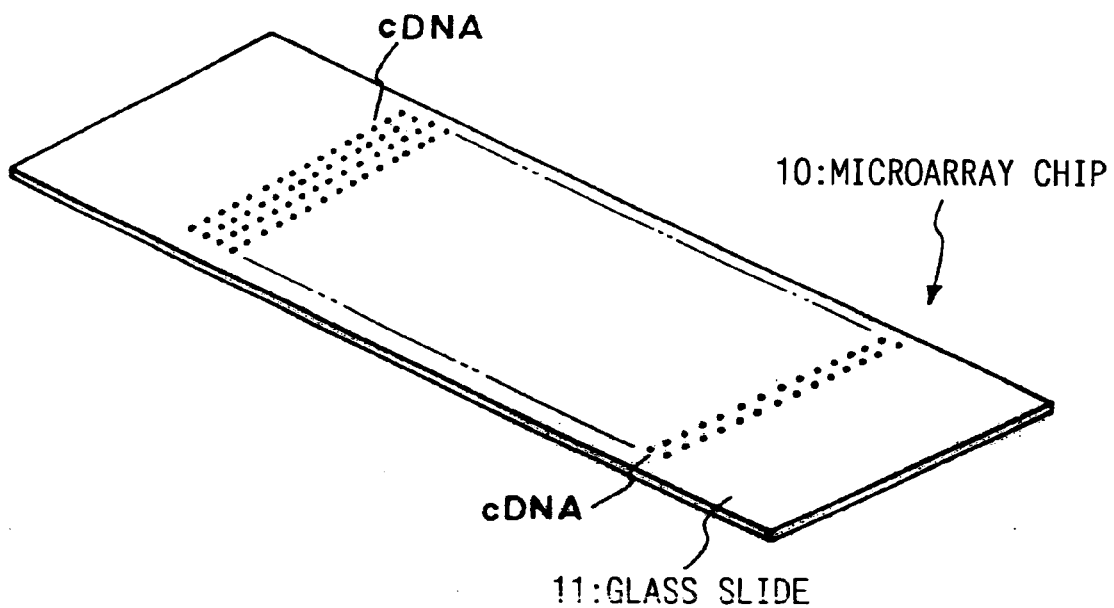
FIG. 3 is a perspective view showing a microarray chip prepared before the hybridization process.

The microarray chip 10" shown in FIG. 3 includes different cDNAs spotted in matrix form at predetermined positions on a glass slide 11. The spotted cDNAs are all known and the corresponding relationship between the predetermined positions and the spotted cDNAs is also known. The DNA of a subject with a genetic disease is labeled with a fluorescent dye and is hybridized with the microarray chip 10" shown in FIG. 3. Only the hybridized, bound substances (targets) 12 are caused to remain on the glass slide 11, and the microarray chip 10 after the hybridization process is obtained as shown in FIG. 2. For explanation, the positions of the bound substances 12 are shown so that they can be discriminated by the naked eye, by comparing the microarray chip 10" of FIG. 3 with the microarray chip 10 of FIG. 2. However, in an actual microarray chip, it is difficult to discriminate the positions with the naked eye, because cDNAs are spotted in high density.

The image reader 1, using the microarray chip 10 as an image carrier, is a fluorescence scanner, constructed of a stage moving section 2, an optical system 3, and a signal processing section 4.

The stage moving section 2 has a two-dimensionally movable light-transmitting stage 21 on which the microarray chip 10 shown in FIG. 2 is placed; a first stepping motor 22 for moving the stage 21 in a Y-axis direction so that excitation light L scans the microarray chip 10 placed on the stage 21; a second stepping motor 23 for moving the stage 21 in an X-axis direction; and a stepping-motor control circuit 24 for driving the stepping motors 22, 23. This construction enables the excitation light L to scan the microarray chip 10 at a predetermined speed within the XY-plane in FIG. 1.

The stepping-motor control circuit 24, as shown in Japanese Unexamined Patent Publication No. 2000-131237, may have the function of position indication means for inputting each predetermined position to the stepping motors 22, 23 to stop the motors so that excitation light L is irradiated only to a predetermined position on the microarray chip 10. The predetermined position that is input to the stepping motor 22, 23 by the stepping-motor control circuit 24 represents each of the positions on the microarray chip 10" of FIG. 3 where cDNAs are spotted. That is, the bound substance 12 is not always present at the predetermined position.

The optical system 3 has an excitation light source 31 for emitting excitation light L; a collimator lens 32 for collimating the excitation light L emitted from the excitation light source 31; a polarization beam splitter 33 for transmitting the excitation light L and reflecting fluorescent light K described later; and a condenser lens 34 for focusing the excitation light L transmitted through the polarization beam splitter 33, to a predetermined size onto the microarray chip 10 placed on the stage 21.

The signal processing section 4 has a photomultiplier 40 having a photoelectron multiplication function of photoelectrically detecting fluorescent light K emitted from the microarray chip 10; an integration circuit 50 as an I/V conversion circuit for converting the current signal, output from the photomultiplier 40, to a voltage signal; and an offset compensation circuit 60 for reducing an offset voltage which could occur because of charge injection in the integral action of the integration circuit 50. The signal processing section 4 further has a logarithmic conversion circuit 70 for logarithmically converting the voltage signal output from the integration circuit 50; an A/D conversion circuit 80 for converting the analog signal, logarithmically converted and compressed by the logarithmic conversion circuit 70, to a digital voltage signal at a sampling frequency $f_S$ of about 10 to 1000 KHz; an operating-mode setting circuit 90; an integral-timing setting circuit 91; and other peripheral circuits.

Figure 4:
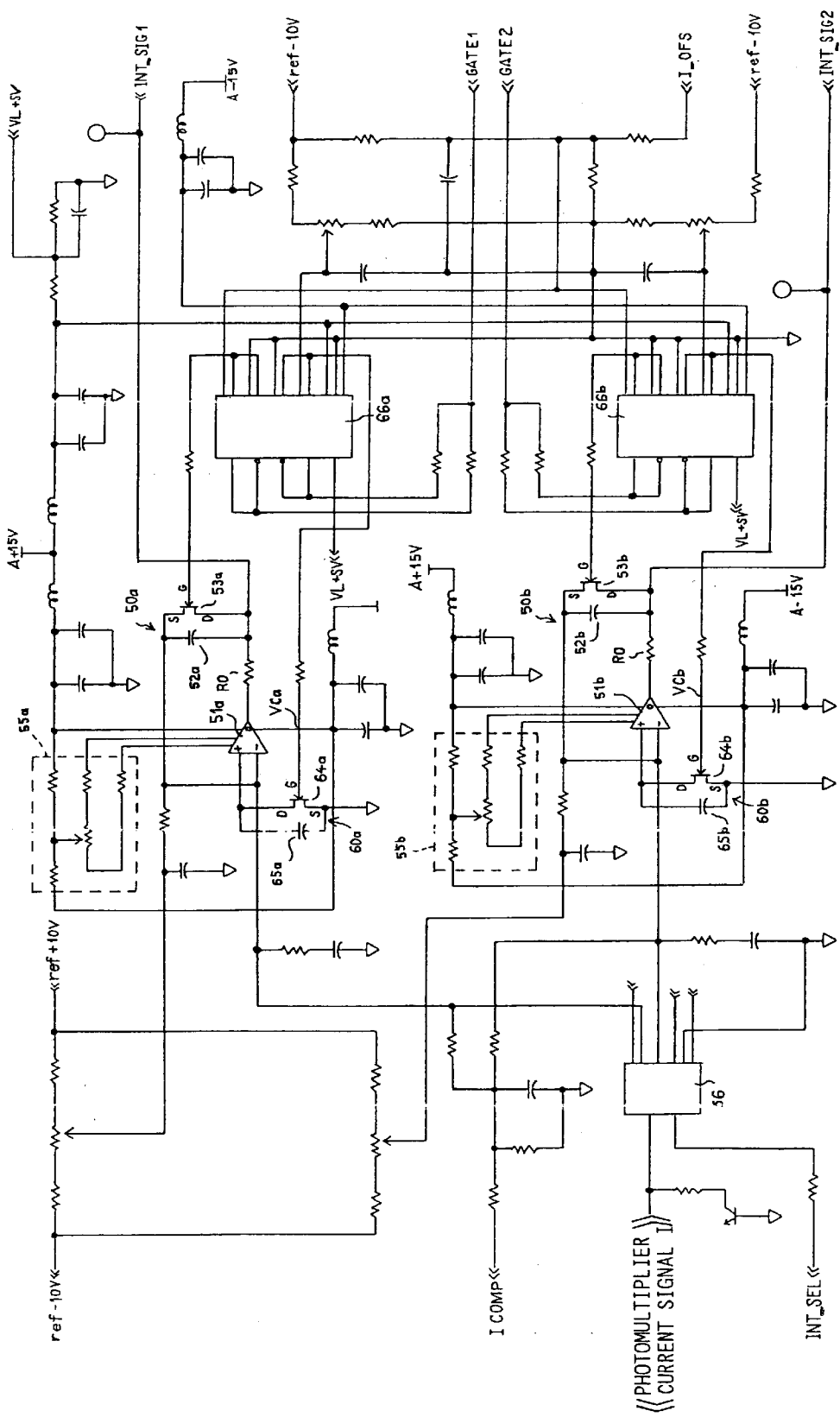
FIG. 4 is a circuit diagram showing the integration circuit and offset compensation circuit of FIG. 1 and the peripheral circuits.
Figure 5:
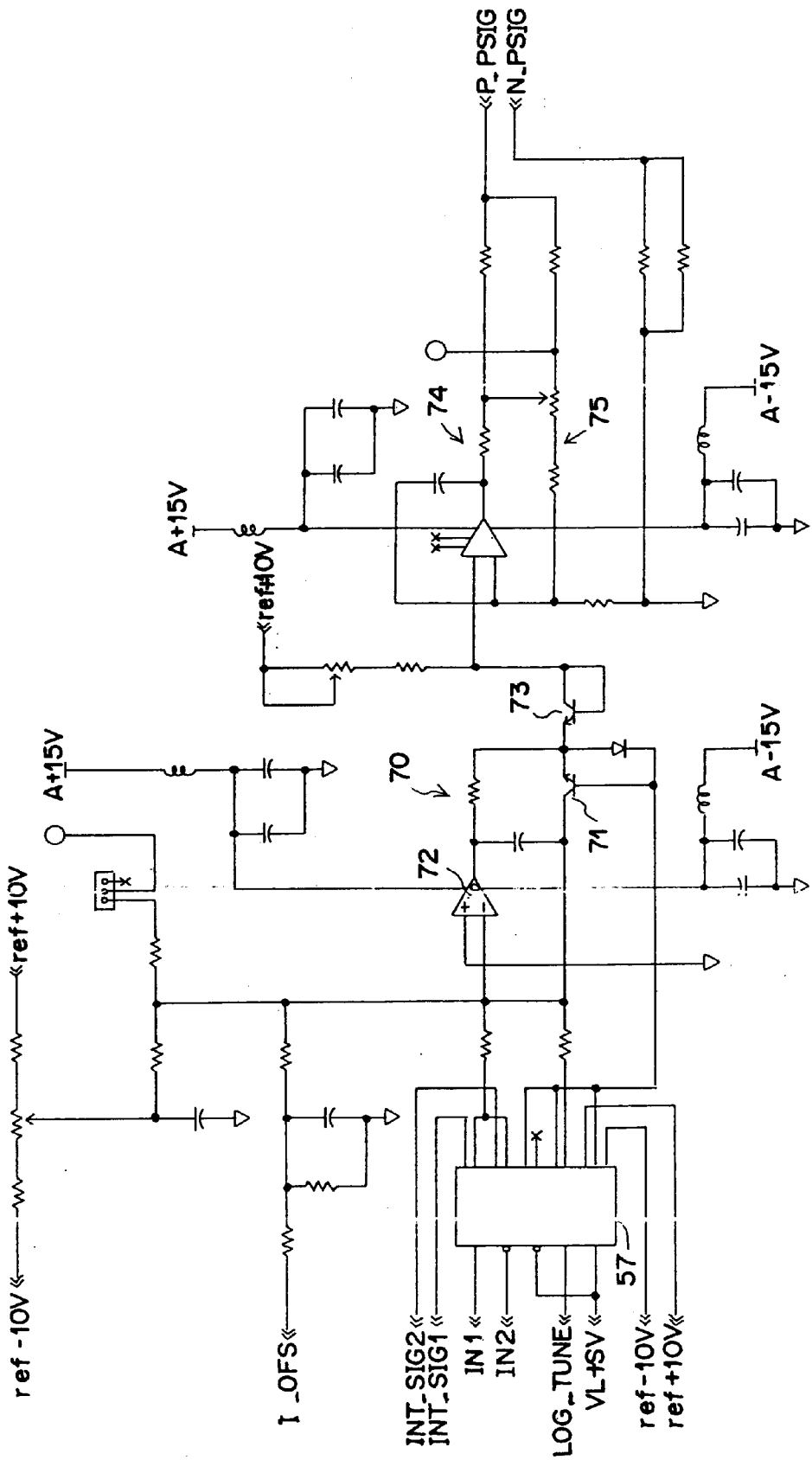
FIG. 5 is a circuit diagram showing the logarithmic conversion circuit of FIG. 1 and the peripheral circuits.
Figure 6A:
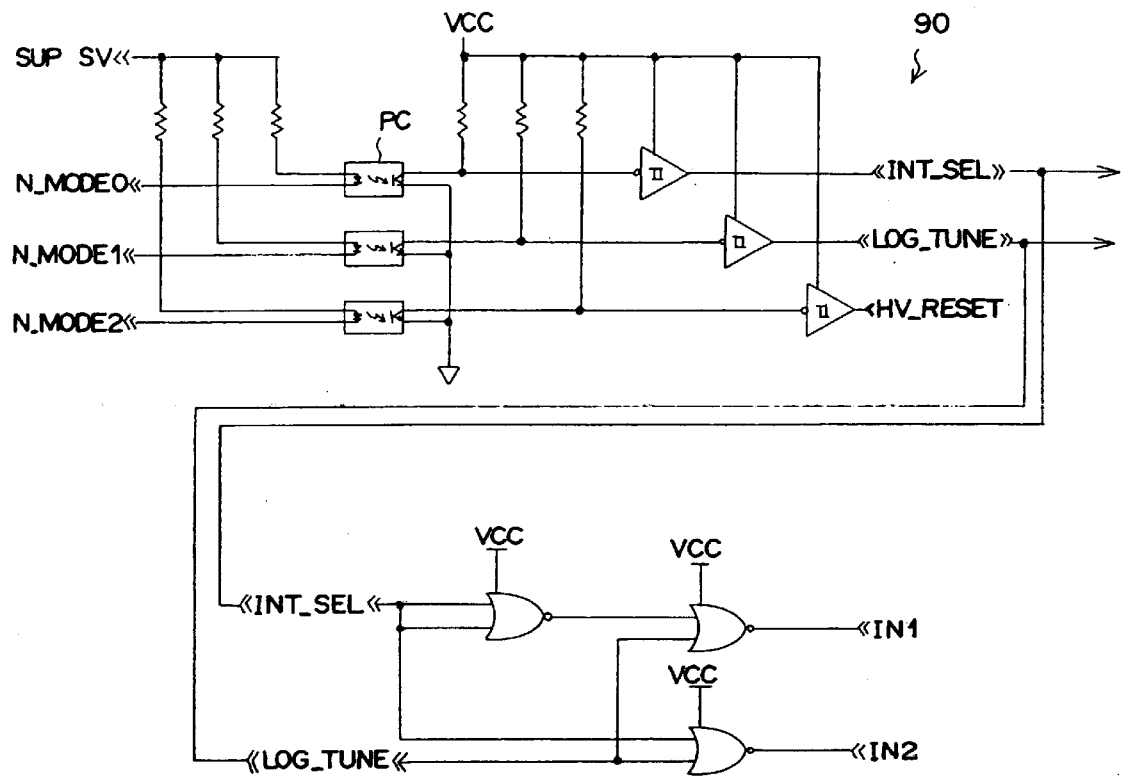
FIG. 6A is a circuit diagram showing the operating-mode setting circuit of FIG. 1.
Figure 6B:
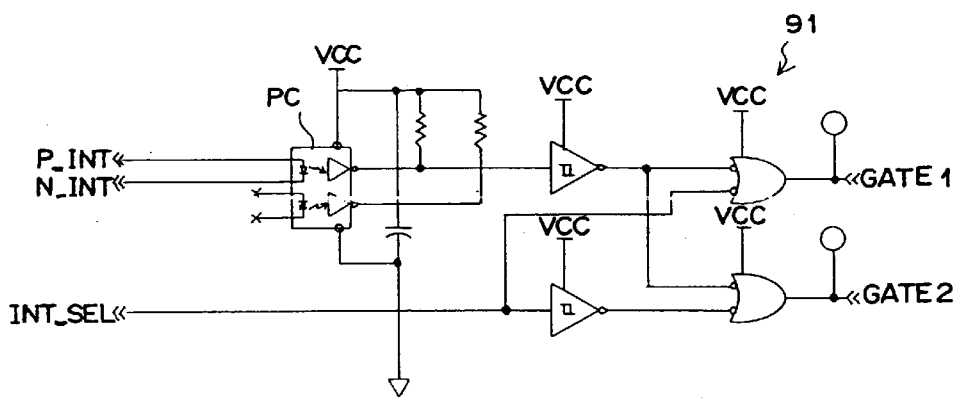
FIG. 6B is a circuit diagram showing the integral-timing setting circuit of FIG. 1.

An example of each circuit in the signal processing section 4 is shown in FIGS. 4 to 6. FIG. 4 shows the integration circuit 50, the offset compensation circuit 60, and the peripheral circuits. FIG. 5 shows the logarithmic conversion circuit 70 and the peripheral circuits. FIG. 6A shows the operating-mode setting circuit 90 and FIG. 6B the integral-timing setting circuit 91. Each circuit in the signal processing section 4 will hereinafter be described in detail with reference to FIGS. 4 to 6.

To start, the integration circuit 50 and the offset compensation circuit 60 will be described with reference to FIGS. 4 and 6.

The image reader 1, which is a fluorescence scanner, requires high-speed performance to some degree. Considering a minimum integral time of 10 $\mu$m, it is necessary to set the capacitance of an integration capacitor small. To meet a wide integral time, the integration circuit 50 is provided with two systems, a high-speed integration circuit 50a and a low-speed integration circuit 50b. The high-speed integration circuit 50a has an operational amplifier 51a as a differential amplifier; an integration capacitor 52a connected between the non-inverting input terminal (−) and output terminal (o) of the operational amplifier 51a; and a reset field-effect transistor (FET) 53a, connected in parallel with the integration capacitor 52, for resetting the integration capacitor 52a. Similarly, the low-speed integration circuit 50b has an operational amplifier 51b, an integration capacitor 52b, and a reset FET 53b. Note in this embodiment that the output terminal of the operational amplifier is connected to the integration capacitor through the output resistance R0. That is, the output terminal of the operational amplifier is not connected directly to the integration capacitor.

The operational amplifier 51a of the high-speed integration circuit 50a requires a low input bias current, high speed, high precision, and short setting time performance. On the other hand, the operational amplifier 51a of the low-speed integration circuit 50b is not required to be as fast as the high-speed integration circuit 50a.

In the case where offset voltage is large, there is provided an offset adjusting trimmer. In the case where the operational amplifiers 51a, 51b with offset adjusting terminals are used as shown in FIG. 4, adjustment circuits 55a, 55b can be connected to the operational amplifiers 51a, 51b through the offset adjusting terminals. In the case of employing an operational amplifier that has no offset adjusting terminal, an adjustment circuit can be connected to the inverting input terminal or non-inverting input terminal of the operational amplifier.

It is preferable to provide a buffer before the integration circuit 50 to ideally operate the integration circuit 50. However, since the occurrence of noise before the integration circuit 50 has to be minimized to have a dynamic range of five significant digits, a current signal from the DC-coupled photomultiplier 40 is input directly to the integration circuit 50.

Theoretically, the circuit constant can be determined so that an output obtained by integrating one pulse output from the photomultiplier 40 becomes one hundred thousandth of the maximum output. Assuming the maximum output of the integration circuit 50 is 5 V, the capacitance of the integration capacitor can be set so that the voltage becomes 5 V when $3 \times 10^{-1}$ C is stored in the integration capacitor. Assuming that a pixel clock for one pixel is 100 μsec, the capacitance of the integration capacitor is calculated as 10000 pF. Since the estimation of one photomultiplier output pulse is performed when the amplification factor is set high, it will exceed the maximum output (average 0.01 mA) of the photomultiplier 40, if an output of five figures is taken. Hence, considering a reduced amplification factor is employed, the capacitance of the low-speed integration capacitor 52b is set to a a few 1000 pF (e.g., 2200 pF). On the other hand, the capacitance of the high-speed integration capacitor 52a is set smaller than that of the low-speed integration capacitor 52b by one power of 10, because it is required to operate at high speed as an integration circuit.

The high-speed integration circuit 50a and the low-speed integration circuit 50b have an input switching circuit 56 (see FIG. 4) at their input sides and an output switching circuit 57 (see FIG. 5) at their output sides so that the operating mode of the signal processing section 4 can be switched. More specifically, the switching circuits 56, 57 can switch each input and output for high speed and low speed so that only either output (voltage signal) is input to the logarithmic conversion circuit 70 being provided after the integration circuit 50 during normal operation. In addition, the output switching circuit 57 is switchable to ground potential for offset adjustments to the logarithmic conversion circuit 70 by disconnecting the integration circuits 50a, 50b.

In this embodiment, the switching circuits 56, 57 each employ an analog switch whose leakage current is small. From the viewpoint of detecting very small current, signal lines are guarded with GND so that they prevent the occurrence of noise due to return current. As shown in FIG. 6A, the operating-mode setting circuit 90 for setting an operating mode is constructed so that it controls the switching circuits 56, 57. The setting of the operating mode of the signal processing section 4 in this construction is listed in Table 1.

TABLE 1

| Mode signal | Selection signal | High-speed integration circuit selection | Low-speed integration circuit selection | Logarithmic conversion circuit selection |
|---|---|---|---|---|
| Mode 0 | INT_SEL | H | L | X |
| Mode 1 | LOG_TUNE | L | L | H |

Since the light intensity of the fluorescent light incident on the photomultiplier 40 is feeble, and the current signal input to the integration circuit 50 is also feeble, the output of the integration circuit 50 is governed by the switching noise due to an integration reset switch. An ordinary analog switch is small in on-resistance and can shorten reset time. However, since the output offset due to charge injection is large, and it is difficult to reduce noise, the integration reset switch employs a field-effect transistor (FET).

In selecting FETs, what acts on charge injection was simulated by changing the parameters of a typical FET model, employing "SPICE." It has been found that a FET with small input capacitance and feedback capacitance is satisfactory. That is, it is found as a condition for selecting a FET that the smaller the junction capacitance, the smaller the charge injection.

For this reason, the reset FETs 53a, 53b, for resetting an integrated charge, each employ an n-channel junction FET with high Gm and low junction capacitance, which is an example of a reduced-noise and low-charge injection device. Note that since a control voltage to the gate is tied directly to fluctuation in the integral capacitance, the wiring is set as short as possible to maintain reduced noise.

On the other hand, even if a preferred FET is selected, offset voltage will become an unallowable level (e.g., 10 to 20 mV) for feeble-light detection, for example, at integral capacitance 200 pF and therefore output offset due to charge injection cannot be made zero. In addition, there is a problem that the polarity of offset voltage (offset direction with respect a steady level) will not be constant. Particularly, when negative voltage is input to the logarithmic conversion circuit 70 being provided after the integration circuit 50, there arises a problem that the operation of the logarithmic conversion circuit 70 will become unstable. Therefore, in this embodiment, the high-speed integration circuit 50a and the low-speed integration circuit 50b are provided with offset compensation circuits 60a, 60b for canceling offset voltages, respectively.

The high-speed offset compensation circuit 60a has a compensation FET 64a, and a compensation capacitor 65a connected in parallel with the compensation FET 64a. The compensation FET 64a has a drain terminal D and a source terminal S, connected between the non-inverting input terminal (+) of the operational amplifier 51a and ground (reference potential), and a gate terminal G to which a control voltage VCa is input for adjusting a variation in the capacitance of the integration capacitor 52a and/or a variation in the capacitance of the reset FET 53a. The low-speed offset compensation circuit 60b, as with the high-speed offset compensation circuit 60a, has a compensation FET 64b and a compensation capacitor 65b.

To cancel the offset voltages due to charge injection, the compensation FETs 64a, 64b are of the same type as the corresponding reset FETs 53a, 53b, and the compensation capacitors 65a, 65b have the same capacitance as the integration capacitors 52a, 52b.

The offset voltages, which are generated when the compensation FETs 64a, 64b are operated, can be changed by the control voltages VCa, VCb applied to the gate terminals G of the compensation FETs 64a, 64b. Therefore, by adjusting the control voltages VCa, VCb, the same offset voltages as those generated in the reset FETs 53a, 53b can be generated in the compensation circuits so that the offset voltages are canceled. Therefore, the offset voltages in the integration circuits 50a, 50b can be adjusted to 0 V.

Note that a variation in the FET capacitance and a variation in the capacitor capacitance can be suppressed by adjusting the gate voltages with which the FETs are driven, respectively.

It has been found from experiments that the temperature changes of the reset FETs 53a, 53b due to charge injection are greater than the offset voltage variations that the operational amplifiers 51a, 51b themselves have. To adjust errors resulting from these temperature changes, it is desirable that the gate voltages of the reset FETs 53a, 53b be adjusted for each of the operational amplifiers 51a, 51b.

In this embodiment, the aforementioned adjustment is made by two kinds, (I_COMP) due to the injection of current to the non-inverting input terminal of the integration circuit, and the gate voltage adjustment (I_OFS) of the compensation FETs 64a, 64b for setting control voltages VCa, VCb.

As previously described, the integration circuit 50 is constructed of two systems for high speed and low speed. However, since only one pair of adjustment inputs is prepared, the integration circuit 50 is constructed so that the two high-speed and low-speed integration circuits 50a, 50b can be respectively adjusted in a non-adjusted state. Adjustments to component variations are made by pre-set resistance (trimmer), and only a fluctuation in temperature and fluctuation with elapse of time are adjusted by operating the analog switches 66a, 66b through external control.

The integration circuits 50a, 50b, to prevent S/N-ratio degradation, have a DC-coupling construction in which the photomultiplier output current is directly integrated. The integration circuits 50a, 50b are also constructed so that integral timing is set by the integral-timing setting circuit 91. More specifically, a timing signal to control integral timing is input to the gate terminals G of the reset FETs 53a, 53b.

The integral-timing setting circuit 91, as shown in FIG. 6B, includes a high-speed photocoupler so that a timing signal with less noise and less jitter is input to the reset FETs 53a, 53b. The integral-timing setting circuit 91 is driven by signals P_INT and N_INT input at the timing that corresponds to a record mode such as pixel size, read line speed, pixel frequency, etc. The integral-timing setting circuit 91 inputs output signals GATE1 and GATE2 to the analog switches 66a, 66b. The analog switches 66a, 66b output timing signals to the reset FETs 53a, 53b to turn them on and off.

Since the photomultiplier output maximum current is 0.01 mA, the output of the high-speed integration circuit 50a becomes 0.045 V/$\mu$sec and the output of the low-speed integration circuit 50b becomes 0.045 V/$\mu$sec. Assuming the maximum output voltages of the integration circuits 50a, 50b are 5 V, the integratable maximum times become 110 $\mu$sec and 1.1 msec, respectively. In the case of high-speed reading whose integral time is short, the dynamic range is limited by the photomultiplier output maximum current. The reset time requires 2 $\mu$sec for a high-speed integrator and 5 $\mu$sec for a low-speed integrator. Care must be taken, because adjustments to the integration circuit cannot be made if there is jitter in the reset time. In addition, for this reset time, the time for taking a dynamic range of about four figures is taken into consideration. The setting examples of integral timing to the high-speed and low-speed integration circuits 50a, 50b are listed in Table 2. Note in Table 2 that for Nos. 4 and 6 and Nos. 5 and 7, the setting of integral timing is switched, depending on operational amplifier type.

TABLE 2

| Nos. | Pixel size $\mu$m | Read line speed mm/sec | Pixel frequency Hz | Integration circuit | Reset time $\mu$sec | Integral time $\mu$sec |
|---|---|---|---|---|---|---|
| 1 | 5 | 400 | 80 k ± 10% | High speed | 2 | 9.25 |
| 2 | 5 | 200 | 40 k ± 10% | High speed | 2 | 20.5 |
| 3 | 10 | 400 | 40 k ± 10% | High speed | 2 | 20.5 |
| 4 | 10 | 200 | 20 k ± 10% | High speed | 2 | 43 |
| 5 | 20 | 400 | 20 k ± 10% | High speed | 2 | 43 |
| 6 | 10 | 200 | 20 k ± 10% | Low speed | 5 | 40 |
| 7 | 20 | 400 | 20 k ± 10% | Low speed | 5 | 40 |
| 8 | 20 | 200 | 10 k ± 10% | Low speed | 5 | 85 |
| 9 | 100 | 800 | 8 k ± 10% | Low speed | 5 | 107.5 |
| 10 | 100 | 200 | 2 k ± 10% | Low speed | 5 | 40 |

Next, the logarithmic conversion circuit 70 will be described with reference to FIG. 5.

The logarithmic conversion circuit 70, as shown in FIG. 5, is basically the same in construction as a conventional circuit where the exponential characteristic of the base-emitter voltage (Vbe) verse emitter current (Ie) of a transistor 71 is put within the feedback group of an operational amplifier 72.

It is preferable that the transistor 71 for logarithmic conversion have good current linearity and have small Cob in a wide bandwidth. The transistor 71 in this embodiment employs an NPN silicon transistor.

It is preferable that the operational amplifier 72 operate stably with high-speed setting, a wide bandwidth, low input bias current, high precision, and unity gain.

A compensation for the amplification factor of a transistor 73 of the same characteristic as the transistor 71 and the amplification factor of an output amplifier 74 of the following stage is made with a resistance circuit 75 with a temperature characteristic of 3300 ppm. The input-output characteristics of the logarithmic conversion circuit 70 are listed in Table 3.

TABLE 3

| Number of figures | Input voltage (V) | Input current (A) | Output at output voltage (V) Tp |
|---|---|---|---|
| 0 | 50 $\mu$ | 10 n | −3.75 |
| 1 | 0.5 m | 100 n | −2.5 |
| 2 | 5 m | 1 $\mu$ | −1.25 |
| 3 | 50 m | 10 $\mu$ | 0 |
| 4 | 0.5 | 100 $\mu$ | 1.25 |
| 5 | 5 | 1 m | 2.5 |

The output signal of the operational amplifier 72 is output to the A/D conversion circuit 80 through the output amplifier 74. It is preferable that the output amplifier 73 use an operational amplifier having a high gain and high-speed performance.

The output impedance of the operational amplifier 72 is matched with the impedance of a signal cable in consideration of the output amplifier 74 on the reception side being constructed of a differential amplifier. If it is viewed back from the output side, the output impedance becomes a load of 200$\Omega$. Therefore, since the operational amplifier 72 alone has sufficient drive ability at the aforementioned output amplitude, an output buffer that is provided in a conventional circuit is eliminated.

The inverting input terminal (−) of the operational amplifier 72 forming the logarithmic conversion circuit 70 receives adjustment voltage for adjusting (offset-adjusting) the output voltage to zero figure when the signal voltage is made zero. This adjustment voltage is able to adjust the maximum range of the offset voltage of the operational amplifier 72. When the offset voltage of the operational amplifier 72 is 0.5 mV, and a resistor connected in series for adjustments has a resistance of 1 M$\Omega$, a voltage range of ±0.1 V becomes necessary.

Next, a description will be given of the peripheral circuits of the photomultiplier 40.

In the periphery of the photomultiplier 40, as shown in FIG. 1, there are provided a resistance dividing type (bleeder circuit type) high-voltage circuit 41 for driving the photomultiplier 40, and an overcurrent protection circuit 42 for protecting the photomultiplier 40 from abnormal current.

Since the maximum output current of the photomultiplier 40 is one tenth that of a conventional photomultiplier, the bleeder current in the high-voltage circuit 41 is set smaller than a conventional one. For example, the high-voltage circuit 41 employs a high amplification factor type of linear bleeder resistance arrangement so that a maximum bleeder current of 0.8 mA is obtained when the maximum direct current is 1000 V.

The high-voltage circuit 40 outputs a high voltage (HV) of about 900 V to the photomultiplier 40. When this occurs, the high voltage HV is output through an LC circuit to cut off switching noise due to a high-voltage source (not shown). In addition, to monitor the voltage of the diode of the final stage of the photomultiplier 40, the high-voltage pressure 41 is constructed so that the circuit voltage of the divided resistor of the final stage can be monitored.

The overcurrent protection circuit 42 decides that the photomultiplier 40 is in an overcurrent state, when either the output of the high-speed integration circuit 50a or the output of the low-speed integration circuit 50b exceeds 5 V. Then, the high voltage HV is made 0 V by an overcurrent detection output held with a flip-flop (not shown). After the cause of the overcurrent has been removed, the overcurrent protection circuit 42 can be cleared by a reset signal (HV_RESET).

Note that since the overcurrent protection circuit 42 detects the outputs of the integration circuits 50a, 50b, there are cases where the overcurrent protection circuit 42 does not protect the photomultiplier 40 from overcurrent or operates incorrectly, depending on the resetting interval for integral action. To avoid this, the overcurrent protection circuit 42 is constructed so that it protects the photomultiplier 40 in the case where the photomultiplier output is maximum when detected, for example, at intervals of 100 μsec, in consideration of the resetting interval.

The photomultiplier 40 is relatively highly sensitive, but has a large dark current due to thermal noise from the photoelectric surface of the photomultiplier 40 or the dynode. Hence, to reduce the dark current, cooling means 45 is provided. The cooling means 45 comprises a Peltier element 46 having the photomultiplier 40 placed thereon, and a drive circuit 47 for driving the Peltier element 46. The cooling means 45 is used to cool the photomultiplier 40. Note that the present invention is not limited to the cooling means 45 employing the Peltier element 46 but may employ various known cooling methods. For example, it may employ a heat sink. This can reduce the possibility of the influence of the dark current when detecting extremely feeble light.

Next, a description will be made of the operation of the image reader 1 of this embodiment.

The microarray chip 10 shown in FIG. 1 is first placed at a predetermined position on the stage 21. Each predetermined position on the microarray chip 10 where cDNA is spotted is caused to correspond to the X-direction position and Y-direction position on the stage 21. This corresponding relation is input from the stepping-motor control circuit 24 to the stepping motors 22, 23.

On the other hand, the excitation light source 31 emits excitation light L. The excitation light L is collimated by the collimator lens 32. The collimated excitation light L is transmitted through the beam splitter 33 and is focused by the condenser lens 34 onto the microarray chip 10 placed on the stage 21.

Based on a scan command input from the stepping-motor control circuit 24, the stepping motors 22, 23 move the stage 21 within the XY-plane so that the excitation light L scans a predetermined scan position on the microarray chip 10, and stop the stage 21 at that position. When the bound substance 12 is present at the scan position irradiated with the excitation light L, the bound substance 12 is irradiated with the excitation light L. With this irradiation, the fluorescent dye in the bound substance 12 is excited and emits fluorescent light K. On the other hand, when the bound substance 12 is not present at the scan position irradiated with the excitation light L, there is no possibility of fluorescent light K being emitted from the microarray chip 10.

When the bound substance 12 is present and emits the fluorescent light K, the fluorescent light K is transmitted through the condenser lens 34 and the polarization beam splitter 33 and is incident on the photomultiplier 40, where it is converted to a current signal according to the quantity of light. The current signal is input to the integration circuit 50, in which it is converted to a voltage signal. The voltage signal is logarithmically compressed by the logarithmic conversion circuit 70 and is converted to a digital signal with a scale factor suitable for the signal amplitude by the A/D conversion circuit 80.

If a fixed time has elapsed from the irradiation of the excitation light L onto the first scan position, the next scan position is input from the stepping-motor control circuit 24 to the stepping motors 22, 23. For instance, only the stepping motor 23 is driven. The stepping motor 23 moves the stage 21 by a predetermined distance in the X-axis direction, and stops the stage 21 after moving it so that the excitation light L is irradiated to the next scan position. Also, the excitation light L irradiates the next scan position. As with the aforementioned, when the bound substance 12 is present, fluorescent light K is emitted from the scan position and is detected by the photomultiplier 40. When it is not present, no fluorescent light is detected.

The aforementioned process is repeated over the whole surface of the microarray chip 10. The signals representing a scan position have been input from the stepping-motor control circuit 24 to the signal processing section 4. In addition, the scan position of the excitation light L, the detection of the fluorescent light K, and the light quantity are caused to correspond to one another, and furthermore, an image is output based on the digital signal output from the A/D conversion circuit 80. Therefore, the functional analysis of the DNA of a subject with a genetic disease is made based on the aforementioned corresponding relation.

FIGS. 7 and 8 show voltage signals, obtained by performing I/V conversion on the current signal output from the photomultiplier 40, employing a conversion resistance of 100 kΩ. The waveform of the voltage signal reflects with high fidelity the waveform of the current signal output from the photomultiplier 40.

Figure 7A:
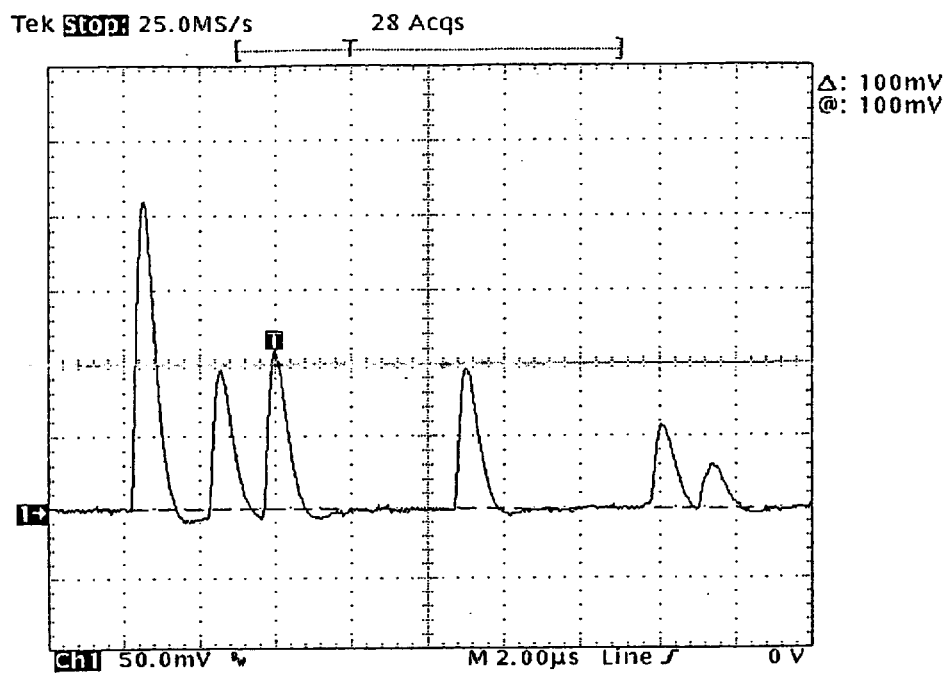
FIGS. 7A, 7B, 8A and 8B are diagrams showing the waveform of a voltage signal obtained by performing I/V conversion on photomultiplier current output, employing conversion resistance.
Figure 7B:
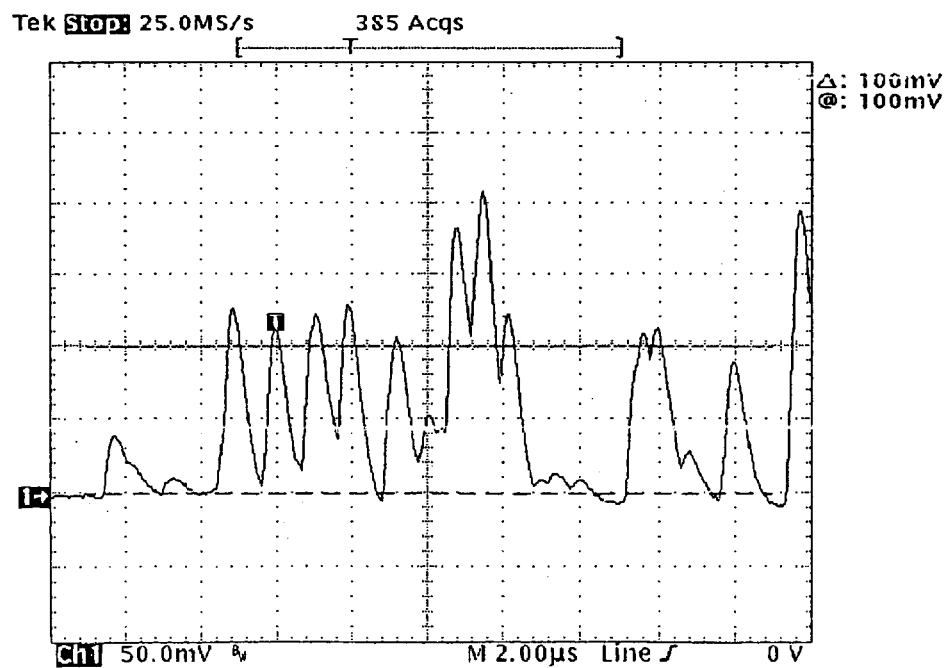
Figure 8A:
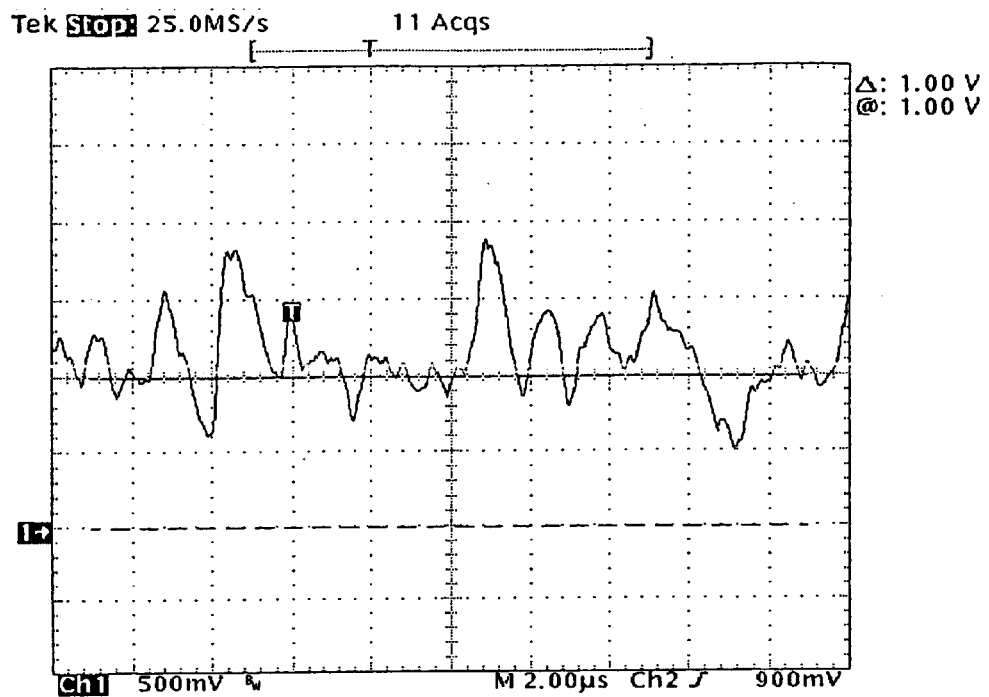
Figure 8B:
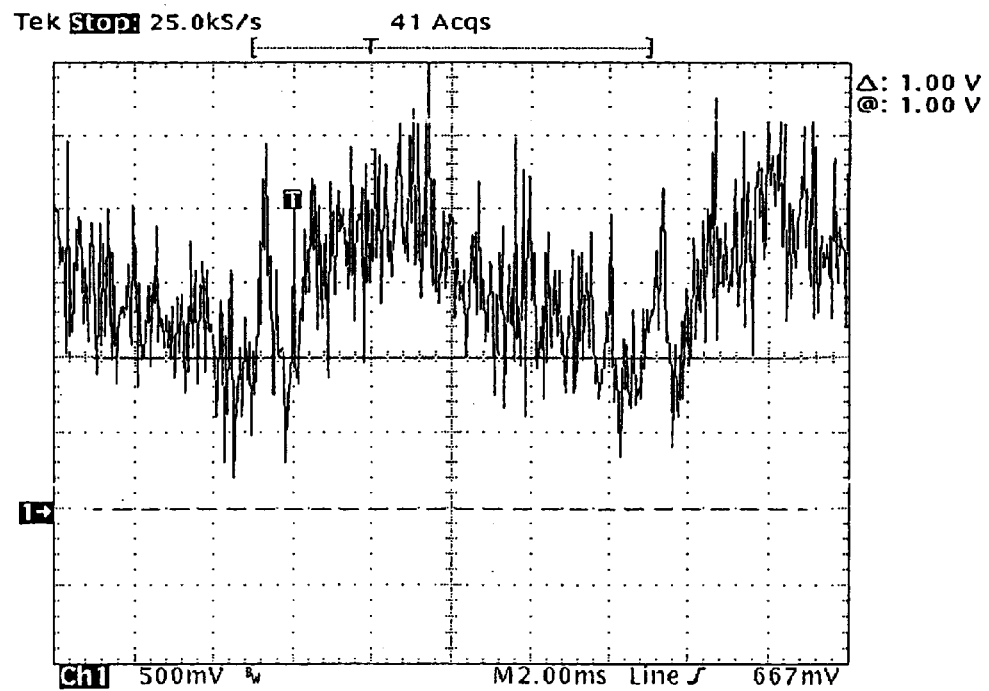

The waveforms shown in FIG. 7A are output signals obtained by performing I/V conversion on the photomultiplier output when very feeble light is input. The output signals indicate dispersed pulses (single-photon events). FIG. 7B shows waveforms obtained when the quantity of light is slightly increased, and pulses that are approximately even in height are output. It is found that the frequency of pulses has increased by a slight increase in the light quantity. If the light quantity is further increased, pulses will be joined together and turned into a direct current output having fluctuation. FIG. 8A shows output waveforms obtained when about ten times as much light quantity as FIG. 7A is input, and FIG. 8B shows output waveforms synchronized with commercial frequency, with the time axis enlarged.

In this embodiment, the output current from the photomultiplier 40 is about 1 μA at its peak, because I/V conversion is performed employing a conversion resistance of 100 kΩ. Since the photomultiplier 40 is a high-speed device, the pulse width is virtually shorter (tens of nanoseconds). However, because of input capacitance for I/V conversion and the bandwidth of the amplifier, an observed waveform of this degree is obtained.

If the quantity of electric charge of the photomultiplier output is predicted from the observed waveform, it becomes 5E-13 (A*S=C). It is found that 3.1E6 electrons have been output in pulse form. This value is approximately coincident with the catalog specification gain 4E6 of the photomultiplier 40 employed in this embodiment.

As described above, when fluorescent light K is emitted from the bound substance 12, this fluorescent light K is incident on the photomultiplier 40 and converted to a current signal according to the light quantity. However, since the fluorescent light K is feeble, the current signal becomes a pulsed current signal or a direct current signal having fluctuation.

Figure 9:
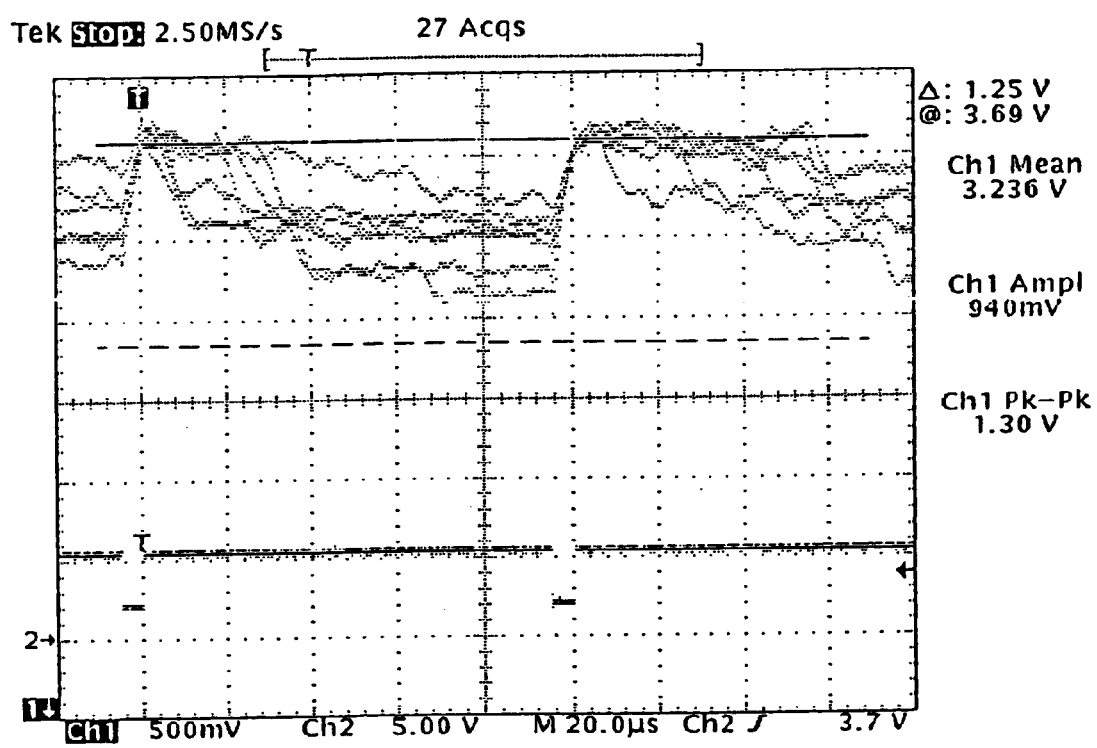
FIG. 9 is a diagram showing the situation in which the current output of the photomultiplier is integrated and converted to a voltage signal.

This current signal is input to the integration circuit 50, in which it is converted to a voltage signal. FIG. 9 shows the situation in which the current output of the photomultiplier is integrated and converted to a voltage signal. The solid line of the cursor in FIG. 9 indicates a reset level and the broken line indicates a level greater than the reset level by one figure. The waveforms obtained by performing integration a few times are shown, employing the waveform storage of an oscilloscope. The current pulses, output from the photomultiplier 40 until the integration circuit 50 is reset, are integrated and converted to a voltage signal. Therefore, the integrated output is obtained as an output voltage corresponding to the number of input pulses, as shown in FIG. 9.

As an example of the output voltage of the integration circuit 50, an output waveform diagram obtained by measuring direct-current input is shown in FIG. 10. The measurements of the direct-current input were made with a resistance of 100 MΩ connected to a reference voltage $V_{ref}$ of −10 V. Although the current level in this case is 100 nA, an output larger than that of FIG. 9 by one or more powers of 10 can be observed.

Thus, in this embodiment, the integration circuit 50a, 50b of mirror integration construction are employed as an I/V conversion circuit for converting the current signal of the photomultiplier 40 to a voltage signal. Therefore, even if the output current of the photomultiplier is in the form of pulses, an appreciable voltage signal corresponding to the input light quantity is obtained from the integration circuits 50a, 50b. The A/D conversion circuit 80 of the following stage is capable of sampling this voltage signal regardless of sampling points, except when the voltage signal coincides with the reset timing. Therefore, the voltage signal is prevented from being sampled in a manner having a considerable level fluctuation in which the voltage signal is not sampled. Hence, the S/N ratio of an image signal can be enhanced compared with a conventional one.

The offset compensation circuit 60 is provided for controlling voltage which is applied to the gate terminal G of the compensation FETs 64a, 64b. The same offset voltage as those generated in the reset FETs 53a, 53b is caused to occur on the side of the compensation circuit 60. In this way, the offset voltages are canceled. As a result, the offset voltages of the integration circuits 50a, 50b are made approximately zero. That is, a variation in the output voltage of the integration circuit can be suppressed regardless of detection systems.

While the present invention has been described with reference to the preferred embodiment thereof, the invention is not to be limited to the embodiment mentioned above.

The aforementioned embodiment adopts the mirror integration construction in which linearity of integrated output is easily assured, because the sampling frequency $f_s$ of the A/D conversion circuit 80 is about 10 to 1000 KHz and therefore high-speed performance is not extreme. However, the construction of the integration circuit is not limited to mirror integration construction, but may be other known constructions such as blocking circuit construction, etc. It is a matter of course that it is preferable to provide the offset compensation circuit 60, etc., even in the case of constructions other than the mirror integration construction.

Figure 11:
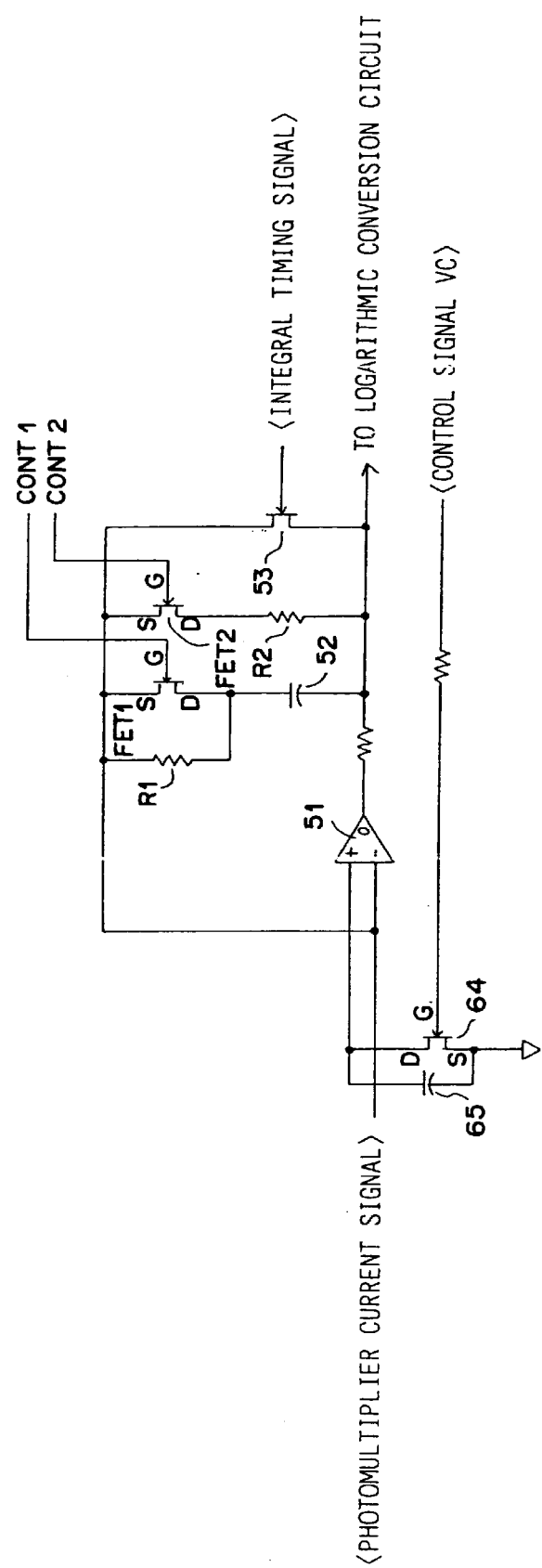
FIG. 11 is a circuit diagram showing an integration circuit constructed so that the integral action thereof is stoppable.

Note that I/V conversion utilizing integral action is disadvantageous when high-speed sampling is required, because resetting becomes necessary. In such a case, the integration circuit 50 in the aforementioned embodiment is constructed so that a parallel circuit, consisting of a resistor R1 and a field-effect transistor FET1, is connected in series with an integration capacitor 52, and that the circuit connected in series is connected in parallel with a series circuit, consisting of a resistor R2 and a field-effect transistor FET2, as shown in FIG. 11. If the integral action of the integration circuit 50 is constructed so as to be stoppable in this manner, it is convenient because the I/V conversion utilizing integral action and conventional I/V conversion utilizing resistance can be switched. In this construction, when high-speed sampling is required and there is a sufficient quantity of light, the integration circuit 50 is caused to perform the conventional I/V conversion instead of the I/V conversion utilizing integral action, whereby the S/N ratio of an image signal can be enhanced.

In the aforementioned embodiment, the image reader of the present invention is constructed as a fluorescence scanner for reading cDNA spotted on a microarray chip. However, biomolecules other than cDNA, such as oligo-DNA, PNA, EST, etc., may be spotted.

In the aforementioned embodiment, the image reader of the present invention is constructed as a fluorescence scanner employing a microarray chip. However, the present invention is also applicable to an image reader that is used in a fluorescence detection system employing something other than a microarray chip used for a gene analysis such as a gene expression analysis, a sequence determination for nucleic acid, a mutation analysis, a polymorphism analysis, etc.

Furthermore, the present invention may be applied to an image reader that is used in (1) autoradiography for displaying image data, obtained by converting positional information on a radioactive labeling substance in a sample to an electrical signal by use of a storable phosphor sheet, on a display such as a CRT display, etc., (2) autoradiography, which utilizes hybridization by Southern blotting, for analyzing positional information on a gene, (3) autoradiography for performing the separation and identification of protein, the measurement of the molecular weight, or the evaluation of the characteristics by a polyacrylamide gel electrophoresis method, (4) a detection system using an electron microscope, or (5) a radiation diffraction image detection system.

Figure 12:
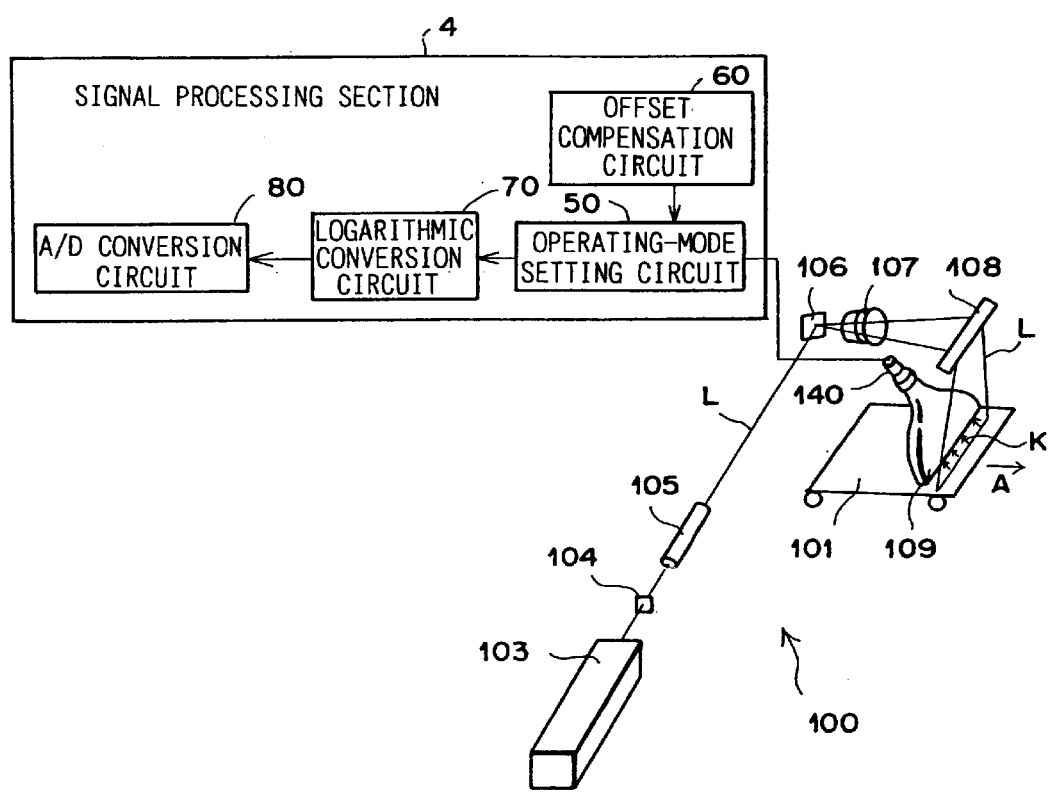
FIG. 12 is a schematic diagram showing an autoradiographic system which employs the image reader of the present invention.

A construction example in applying the present invention to an image reader used in autoradiography is shown in FIG. 12.

FIG. 12 shows an autoradiographic system 100 employing the image reader of the present invention. The autoradiographic system 100 differs from the aforementioned embodiment in that the microarray chip 10 is replaced with a storable phosphor sheet 101 and that the stage moving section 2 and the optical system 3 are replaced with means for scanning the storable phosphor sheet 101 with excitation light. However, a signal processing section 4 is the same as the aforementioned embodiment. The autoradiographic system 100 can employ the autoradiographic system shown in the aforementioned Japanese Patent Publication No. 1(1989)-60784 or Japanese Unexamined Patent Publication No. 10(1998)-3134, by replacing the signal processing section of the system with that of the present invention.

In FIG. 12, the positional information on a radioactive labeling substance in a sample (not shown) is stored in the form of radiation energy in the storable phosphor sheet 101. For instance, in the case where the separation and identification of protein, the measurement of the molecular weight, or the evaluation of the characteristics is performed by a polyacrylamide gel electrophoresis method, the positional information on the radioactive labeling substance in the sample is stored in the storable phosphor sheet 101 in the following manner. That is, polyacrylamide gel is poured into and held between two glass plates. With the two glass plates upright, the sample containing the radioactive labeling substance is poured and electrophoresed under an electric field. After electrophoresis, the two glass plates are separated and the sample attached to one of the two is transferred onto a support body such as filter paper and dried. Then, the transfer support body is stacked on the storable phosphor sheet 1 and is exposed to light so that the positional information on the radioactive labeling substance in the sample is stored in radiation-energy form in the storable phosphor sheet 101.

Next, the storable phosphor sheet 101 with the positional information is scanned with laser light L and excited so as to emit photostimulated luminescent light. The laser light L from a laser light source 103 is passed through a filter 104, and the wavelength region corresponding to the wavelength region of the photostimulated luminescent light emitted from the storable phosphor sheet 101 is cut off.

Next, the beam diameter of the laser light L is adjusted accurately by a beam expander 105. The adjusted laser light L is incident on an optical deflector 106 such as a Galvano mirror. The laser light L reflected by the optical deflector 106 is passed through an fθ lens 107 and is reflected by a plane reflection mirror 108 so that it is incident one-dimensionally on the storable phosphor sheet 101. The fθ lens 107 is provided so that the laser light L can always scan the storable phosphor sheet 101 at uniform beam speed.

In synchronization with the scan of the storable phosphor sheet 101 by the laser light L, the storable phosphor sheet 101 is moved in the direction of arrow A in FIG. 12 so that the whole surface thereof is scanned with the laser light L. If it is irradiated with the laser light L, the storable phosphor sheet 101 emits photostimulated luminescent light K having a quantity of light proportional to the stored radiation energy. The photostimulated luminescent light K is incident on an optical guide 109.

The optical guide 109 has a straight light-receiving end and an annular light-emergence end. The light-receiving end is disposed so as to be opposed to the scanning line on the storable phosphor sheet 101, while the light-emergence end is connected to the light-receiving surface of a photoelectric conversion type optical detector 140, which has a photon multiplication function, such as a photomultiplier, etc.

With the aforementioned construction, the photostimulated luminescent light K emitted from the storable phosphor sheet 101 according to irradiation of the laser light L is incident on the optical guide 109. The photostimulated luminescent light K incident on the optical guide 109 is received by the optical detector 140 through the light emergence end of the guide 109, while repeating total reflection within the interior of the guide 109.

The light-receiving surface of the optical detector 140 has an excitation light cut filter attached thereto. The excitation light cut filter is used for transmitting only light that has the wavelength region of the photostimulated luminescent light K emitted from the storable phosphor sheet 101, and cutting off light that has the wavelength region of the laser light L. Thus, the optical detector 140 photoelectrically detects only the photostimulated luminescent light K emitted from the storable phosphor sheet 101.

As with the aforementioned embodiment, a current signal, which has a magnitude corresponding to the light quantity of the photostimulated luminescent light K detected photoelectrically by the optical detector 140, is converted to a voltage signal by the integration circuit 50. The voltage signal is compressed logarithmically by the logarithmic conversion circuit 70 and is converted to a digital signal with a scale factor suitable for the signal amplitude by the A/D conversion circuit 80.

Even when the current signal detected by the optical detector 140 is in the form of pulses because of the feeble, photostimulated luminescent light K, the use of the integration circuit 50 makes it possible to obtain a voltage signal corresponding to an input light quantity, as with the aforementioned embodiment. Thus, the S/N ratio of an image signal can be enhanced compared with a conventional one.

In the embodiment employing a microarray chip as an image carrier (hereinafter referred to as a first embodiment), the read operation is performed by moving the microarray chip. On the other hand, in the embodiment employing a storable phosphor sheet as an image carrier (hereinafter referred to as a second embodiment), the read operation is performed by moving laser light with the optical deflector. For this reason, there is a great difference in speed at which laser light is scanned, between the first and second embodiments.

In the first embodiment, the scanning speed is 200 to 800 mm/sec and the sampling speed 10 to 100 μsec/pix. In the second embodiment, the scanning speed is 10 to 30 m/sec and the sampling speed 1 to 10 μsec/pix. The present invention is more effective in the first embodiment whose scanning speed is slower.

While certain representative embodiments and details have been shown for the purpose of illustrating the present invention, it will be apparent to those skilled in this art that various changes and modifications may be made without departing from the scope of the invention hereinafter claimed.

What is claimed is:

1. An image reader comprising:

excitation light irradiation means for irradiating excitation light to an image carrier carrying a fluorescent image or radiation image related to a living organism;

photoelectric conversion means, which has a photon multiplication function, for photoelectrically detecting feeble light emitted by irradiation of said excitation light, and outputting a current signal which has a magnitude corresponding to the light quantity of said feeble light;

a current-voltage conversion circuit for converting said current signal to a voltage signal; and a logarithmic conversion circuit for logarithmically converting said voltage signal converted by said current-voltage conversion circuit;

wherein an integration circuit, DC-coupled with said photoelectric conversion means, is employed as said current-voltage conversion circuit.

2. The image reader as set forth in claim 1, further comprising means for cooling said photoelectric conversion means.

3. The image reader as set forth in claim 1, further comprising an offset compensation circuit which cancels offset voltage due to charge injection.

4. The image reader as set forth in claim 1, further comprising an analog-digital conversion circuit, provided after said logarithmic conversion circuit, for performing analog-digital conversion on the logarithmically converted voltage signal at a sampling frequency of between 10 KHz and 1 MHz.

5. The image reader as set forth in claim 4, wherein said integration circuit has a differential amplifier, an integration capacitor connected between one input terminal and an output terminal of said differential amplifier, and a reset field-effect transistor, connected in parallel with said integration capacitor, for resetting said integration capacitor.

6. The image reader as set forth in claim 4, further comprising means for cooling said photoelectric conversion means.

7. The image reader as set forth in claim 1, wherein said current-voltage conversion circuit is constructed so that it can stop integral action of said integration circuit.

8. The image reader as set forth in claim 7, further comprising means for cooling said photoelectric conversion means.

9. The image reader as set forth in claim 7, wherein said integration circuit has a differential amplifier, an integration capacitor connected between one input terminal and an output terminal of said differential amplifier, and a reset field-effect transistor, connected in parallel with said integration capacitor, for resetting said integration capacitor.

10. The image reader as set forth in claim 9, wherein said integration circuit has a mirror integration construction in which said integration capacitor is connected between an inverting input terminal and an output terminal of said differential amplifier.

11. The image reader as set forth in claim 10, further comprising means for cooling said photoelectric conversion means.

12. The image reader as set forth in claim 1, wherein said integration circuit has a differential amplifier, an integration capacitor connected between one input terminal and an output terminal of said differential amplifier, and a reset field-effect transistor, connected in parallel with said integration capacitor, for resetting said integration capacitor.

13. The image reader as set forth in claim 12, further comprising means for cooling said photoelectric conversion means.

14. The image reader as set forth in claim 12, further comprising an offset compensation circuit which has a compensation field-effect transistor, said compensation field-effect transistor having a drain terminal and a source terminal, connected between the other input terminal of said differential amplifier and a reference potential, and also having a gate terminal to which control voltage is input for adjusting a capacitance variation in said integration capacitor and/or a capacitance variation in said reset field-effect transistor.

15. The image reader as set forth in claim 14, wherein said integration circuit has a mirror integration construction in which said integration capacitor is connected between an inverting input terminal and an output terminal of said differential amplifier.

16. The image reader as set forth in claim 14, further comprising means for cooling said photoelectric conversion means.

17. The image reader as set forth in claim 14, wherein said reset field-effect transistor and said compensation field-effect transistor are junction field-effect transistors.

18. The image reader as set forth in claim 17, wherein said integration circuit has a mirror integration construction in which said integration capacitor is connected between an inverting input terminal and an output terminal of said differential amplifier.

19. The image reader as set forth in claim 17, further comprising means for cooling said photoelectric conversion means.

\* \* \* \* \*